(12) United States Patent
Dautartas et al.

(10) Patent No.: US 6,320,997 B1
(45) Date of Patent: Nov. 20, 2001

(54) SELF-ALIGNING 1XN ROTARY OPTICAL SWITCH

(75) Inventors: Mindaugas Fernand Dautartas, Alburtis; Joseph Michael Freund, Fogelsville; Dennis Stefanik, Weisenberg Township Lehigh County, all of PA (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/468,435

(22) Filed: Dec. 21, 1999

(51) Int. Cl.[7] .................................................. G02B 6/26
(52) U.S. Cl. ........................... 385/19; 385/25; 385/16; 385/140
(58) Field of Search ................................. 385/19, 25, 26, 385/16, 140

(56) References Cited

U.S. PATENT DOCUMENTS

| | | | |
|---|---|---|---|
| 4,378,144 | * 3/1983 | Duck et al. | 385/16 |
| 4,589,726 | 5/1986 | Buhrer . | |
| 5,031,986 | * 7/1991 | Mori | 385/16 |
| 5,115,481 | 5/1992 | Buhrer . | |
| 5,259,054 | * 11/1993 | Benzoni et al. | 385/89 |
| 5,420,946 | * 5/1995 | Tsai | 385/16 |
| 5,611,009 | 3/1997 | Pan . | |
| 5,664,034 | * 9/1997 | Mock | 385/25 |
| 5,815,614 | 9/1998 | Pan . | |
| 5,864,643 | 1/1999 | Pan . | |
| 5,920,667 | 7/1999 | Tiao et al. . | |

* cited by examiner

Primary Examiner—Darren Schuberg
Assistant Examiner—Fayez Assaf
(74) Attorney, Agent, or Firm—Wendy W. Koba (57) ABSTRACT

A self-aligned 1×N fiber optic switch uses silicon optical bench technology to provide the alignment between the single fiber and the "selected" one-out-of-N fibers. A first substrate stack is used to support the single fiber, using a via etched through the thickness of the stack, and includes alignment fiducials formed on the top surface thereof. A second substrate stack is used to similarly support an array of N fibers, the array disposed in a circular arrangement with respect to the top surface of the second substrate stack. A set of alignment fiducials is also formed on the top surface of the second substrate stack. One alignment feature includes a "centering" fiducial to allow for the two stacks to be properly aligned. Another alignment fiducial includes a circular channel, having a diameter greater than that of a fiber array, and allowing for alignment sphere to "rest" in the channel when the substrate stacks are mated. The movement of the alignment sphere in the channel provides for controlled "switching" between fibers in the circular array of N fibers.

25 Claims, 8 Drawing Sheets

SELF-ALIGNING 1XN ROTARY OPTICAL SWITCH

TECHNICAL FIELD

The present invention relates to a 1×N optical switch and, more particularly, to a 1×N optical switch utilizing silicon optical technology to form a self-aligning arrangement.

BACKGROUND OF THE INVENTION

In a 1×N optical switch, a single optical fiber forms an optical path with an optical fiber selected from N optical fibers. Therefore, a signal propagating along the single fiber will be coupled into one of the selected N fibers. Similarly, a signal propagating along the selected fiber (in the opposite direction) will be coupled into the single fiber. A switching arrangement is required to assist in the selection for the one-out-of-N fibers.

In electromechanical 1×N optical switches, the switching operation is effected by the movement of an end of the single fiber relative to the ends of the N optical fibers. To form an optical path, the end of the single optical fiber is aligned with the end of the selected fiber from the N fibers. In such systems, alignment of the fiber ends is critical and much precision is required with the electromechanical drive devices, such as motors and their movements, to ensure accurate and reproducible alignment of the single fiber with each of the n optical fibers. Nonetheless, performance of such switches has remained poor with use restricted to multimode optical fibers. In present day optical networks, it is often desirable to use single mode fibers, not multimode fibers.

An exemplary prior art 1×N switch that has allowed for the use of single mode fibers is disclosed in U.S. Pat. No. 5,359,683, issued to J. Pan on Oct. 25, 1994. In this arrangement, a set of GRIN lenses, disposed between the single fiber and the N fibers, is used to ameliorate the effects of misalignment and provide better coupling between the single fiber and the selected fiber. While considered an improvement, the arrangement is difficult and expensive to manufacture, requiring individual stepper motors to align each GRIN lens with the selected fiber.

A need remains, therefore, for a 1×N optical switch, suitable for use with single mode fibers, that is relatively inexpensive to manufacture, yet provides the needed alignment between the single fiber and the selected one-out-of-N fibers.

SUMMARY OF THE INVENTION

The need remaining in the prior art is addressed by the present invention, which relates to a 1×N optical switch and, more particularly, to a 1×N optical switch utilizing silicon optical bench technology to form a self-aligning arrangement.

In accordance with the teachings of the present invention, a first "stack" of silicon substrates is formed to support a single optical fiber within a via formed through the thickness of the stack. A second "stack" of silicon substrates is formed to support an array of N optical fibers in a circular pattern. The two stacks are supported in a "face-to-face" assembly so that the endface of the single fiber will align with the endface of a selected fiber from the array of N fibers. Self-alignment between the single fiber and the selected fiber is provided in the present invention by using a set of alignment fiducials formed on the top surfaces of each substrate stack. In particular, a pair of aligning "centering" fiducials are formed on the stack surfaces, one stack including (for example) a centered pyramidal detent and the other stack including an alignment sphere. The ability to "switch" between selected fibers in the circular array is provided in accordance with the present invention by forming a circular alignment channel around the perimeter of one substrate stack, with an alignment sphere disposed on the surface of the remaining stack such that the sphere will "ride" in the channel when the stacks are mated. A set of rounded stops are disposed at proper locations around the channel so that the alignment sphere will contact a rounded stop when the selected fiber is in proper alignment with the single fiber. When it is desired to "switch" to another one of the N fibers, the piece parts can be slightly separated (either automatically or manually) to lift the alignment sphere over the rounded stop and allow the stack to rotate.

In one embodiment of the present invention, the channel is formed on the substrate stack include the circular fiber array. In an alternative embodiment, the channel is formed on the substrate stack including the single fiber. Either embodiment is acceptable and within the scope of the present invention.

It is an advantage of the present invention that silicon may be used to form the substrates (or at least a "master" set of substrates), with conventional photolithography techniques used to form the alignment channel and detents. The capability of controlling the silicon etch allows for the alignment elements to be formed with extreme accuracy, resulting in alignment between the single fiber and selected fiber on the order of 1–2 $\mu$m.

Other and further aspects of the present invention will become apparent during the course of the following discussion and by reference to the following drawings.

BRIEF DESCRIPTION OF THE DRAWINGS

Referring now to the drawings, where like numerals represent like parts in several views.

DETAILED DESCRIPTION

Figure 1:
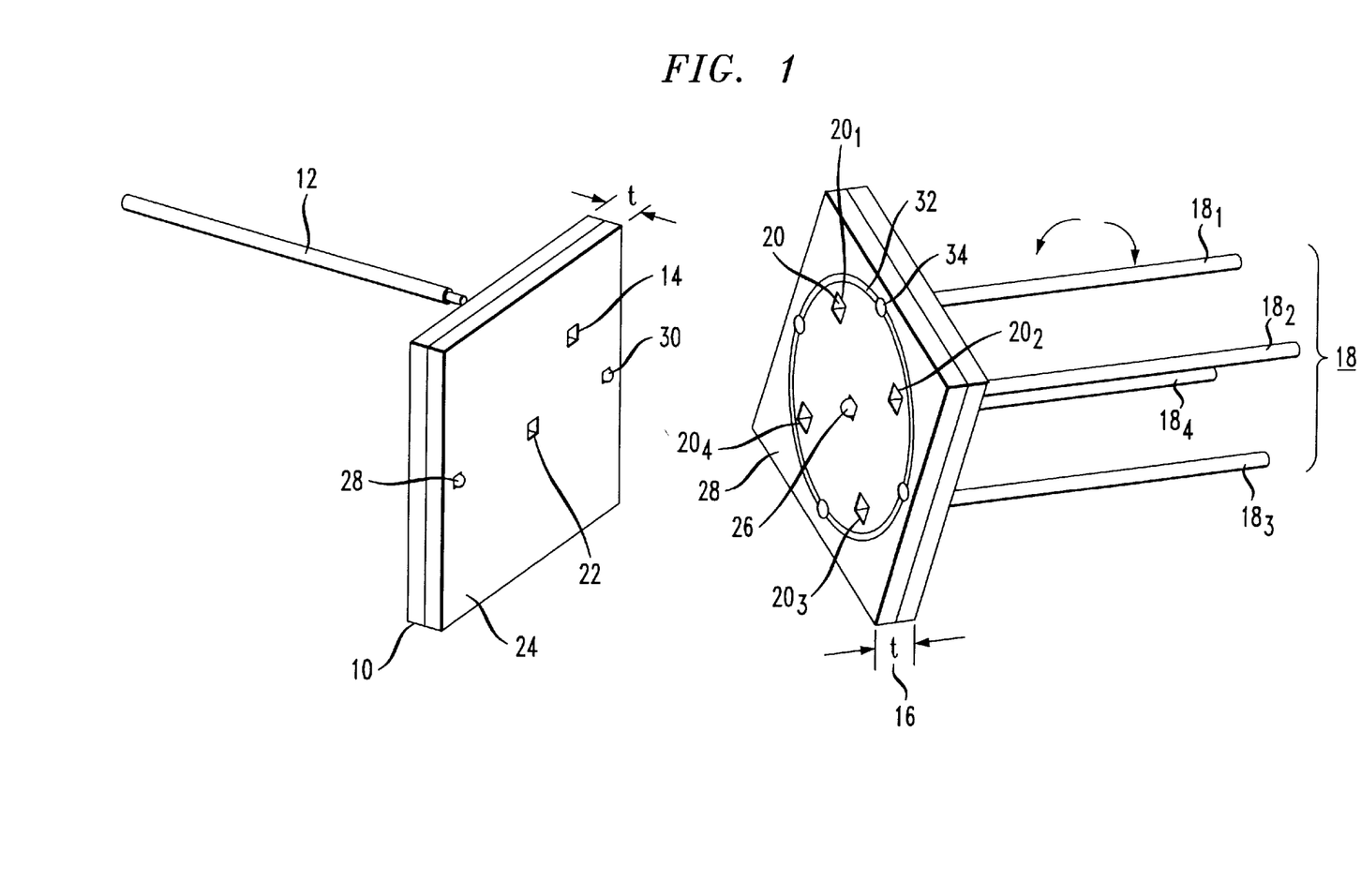
FIG. 1 illustrates in simplified form, a pair of substrate stacks used to form the self-aligned 1×N optical fiber switch of the present invention.

A simplified, exploded view of a pair of stacked substrates useful in forming the self-aligned 1×N optical fiber switch of the present invention. As shown, the switch includes a first substrate stack 10, used to support a single optical fiber 12, where single optical fiber 12 is inserted in stack 10 through a via 14 formed through the thickness t of the stack. A second substrate stack 16 is used to support an array of fibers 18, in this particular example, a set of four fibers. As shown, a set of vias 20 are formed through the thickness t of second stack 16 and disposed in a circular pattern to support fiber array 18, each fiber $18_i$ disposed within an associated via $20_i$.

In accordance with the present invention, second substrate stack 16 is rotated with respect to first substrate stack 10 (as indicated by the arrows in FIG. 1) so as to provide selection of one of fibers $18_1$–$18_4$ to align with single fiber 12. Alignment is achieved by including central alignment features (such as a mating alignment sphere and pyramidal detent) on the top surface of each substrate stack. In the embodiment of FIG. 1, first substrate stack 10 is formed to include a centrally-disposed pyramidal detent 22 in top surface 24 and second substrate stack 16 is formed to include a centrally-disposed alignment sphere 26 in top surface, where detent 22 will mate with alignment sphere 26 upon attachment of first stack 10 to second stack 16 (indicated by the dotted line in FIG. 1). Therefore, by controlling the location of detent 22 and sphere 26, the stacks will be aligned with one another upon attachment. It is to be understood that the location of the pyramidal detent and sphere may be reversed, with first substrate stack 10 formed to include an alignment sphere and second substrate stack 16 formed to including a centralized pyramidal detent.

Alignment and rotational movement of the substrate stacks are provided in the present invention, as discussed above, by using an alignment channel and associated sphere to control the relative motion of one substrate stack with respect to the other. In the embodiment as illustrated in FIG. 1, first substrate stack 22 is shown as including a pair of alignment spheres 30 (in general, only one such sphere is required) disposed within top surface 24 of first stack 22. Second substrate stack 16 includes a circular alignment channel 32 (of a shallow, U-shaped form) disposed as shown beyond the periphery of fiber array 18. In accordance with the present invention, sphere(s) 30 will ride in alignment channel 32 so as to allow for the rotational movement required to provide switching between fibers in fiber array 18, without losing alignment between first and second substrate stacks 10,16. As with the location of the centralized pyramidal detent and alignment sphere, the locations of sphere(s) 30 and alignment channel 32 may be reversed, with the alignment channel formed in top surface 24 of first substrate stack 10 and alignment sphere(s) 30 formed in top surface 28 of second substrate stack 16. Referring to FIG. 1, and as will be discussed in detail below, a plurality of rounded stops 34 are disposed at predetermined locations within channel 32. In practicing the present invention, alignment sphere(s) 30 will move freely around channel 32 until contacting a rounded stop 34. By properly locating stops 34 with respect to the locations of each fiber $18_i$, second substrate stack 16 can be rotated and stopped when an exemplary fiber 18i is alignment with single fiber 12. When it is desired to "switch" to another selected fiber 18, the substrate stacks can be slightly pulled away from one another, allowing alignment sphere(s) 30 to ride over the contacting stop $34_i$ and again move freely within channel 32 until contacting the next mechanical stop $34_{i+1}$. As will be discussed in detail below, the housing for an exemplary 1×N switch of the present invention may be formed to accommodate such movement of the substrate stacks with respect to one another.

Figure 2:
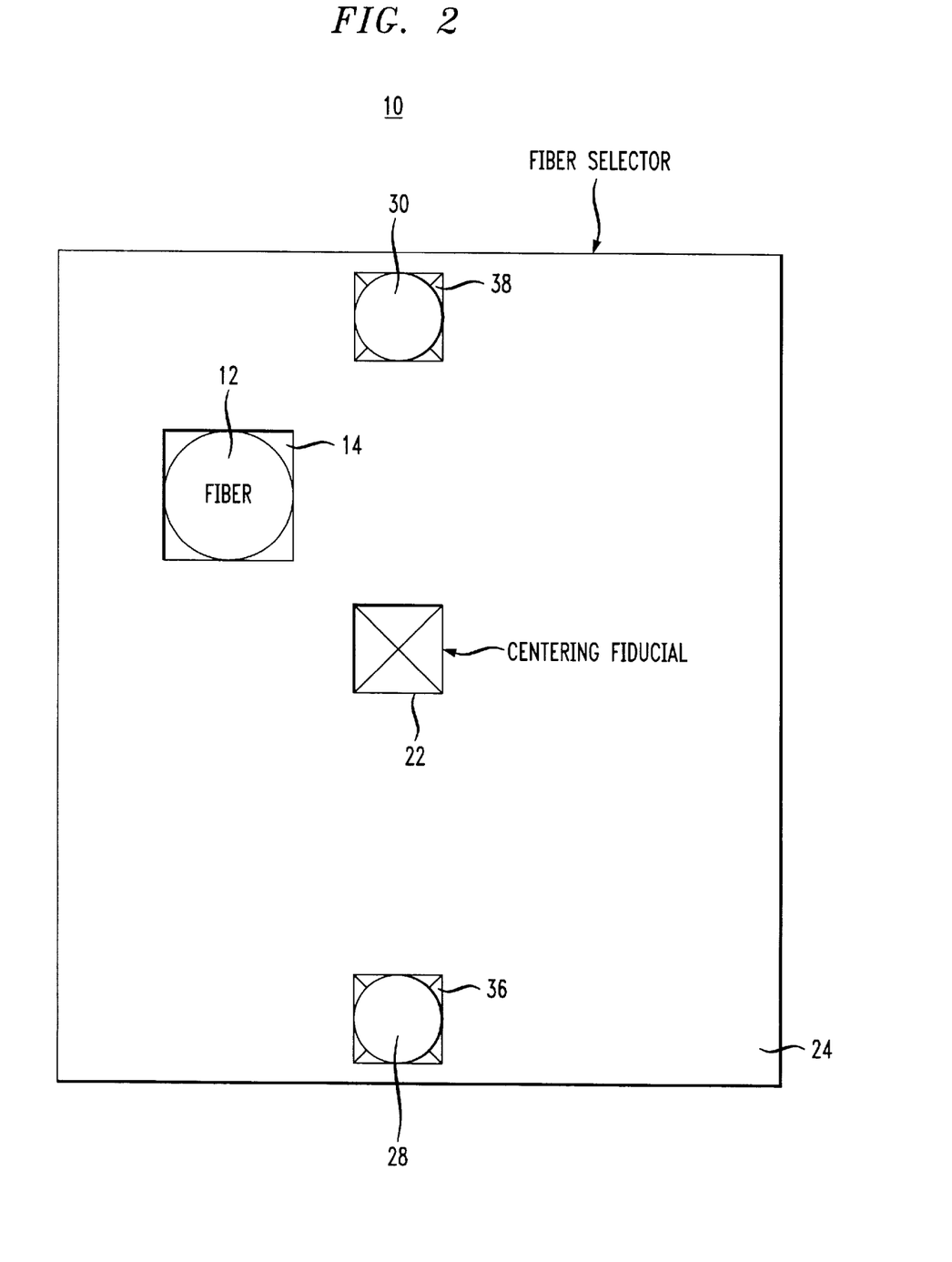
FIG. 2 is a top view of the substrate stack used to support the single fiber in the 1×N optical fiber switch, this embodiment including alignment spheres and a centering fiducial.

A top view of first substrate stack 10 is shown in FIG. 2, in particular illustrating top surface 24 of first substrate stack 10. Centering fiducial 22, in this example a pyramidal detent, is shown as formed in the center of top surface 24. In the case where substrate stack 10 comprises a plurality of silicon substrates, pyramidal detent 24 can be formed by using an isotropic etch, such as hydrofluoric acid/nitric acid/acetic acid (HNA), on top surface 24. The location of alignment sphere(s) 30, as well as fiber-supporting via 14, can be determined by using the same etch mask as used to form pyramidal detent 22. As shown in FIG. 2, alignment spheres (for example, silicon spheres) are disposed within pyramidal detents 36, 38 also formed in top surface 24. Therefore, a predetermined set of etch masks including defining locations for detents 22, 36, 38 and via 14 can be formed, with the spacing between each feature well-controlled.

Figure 3:
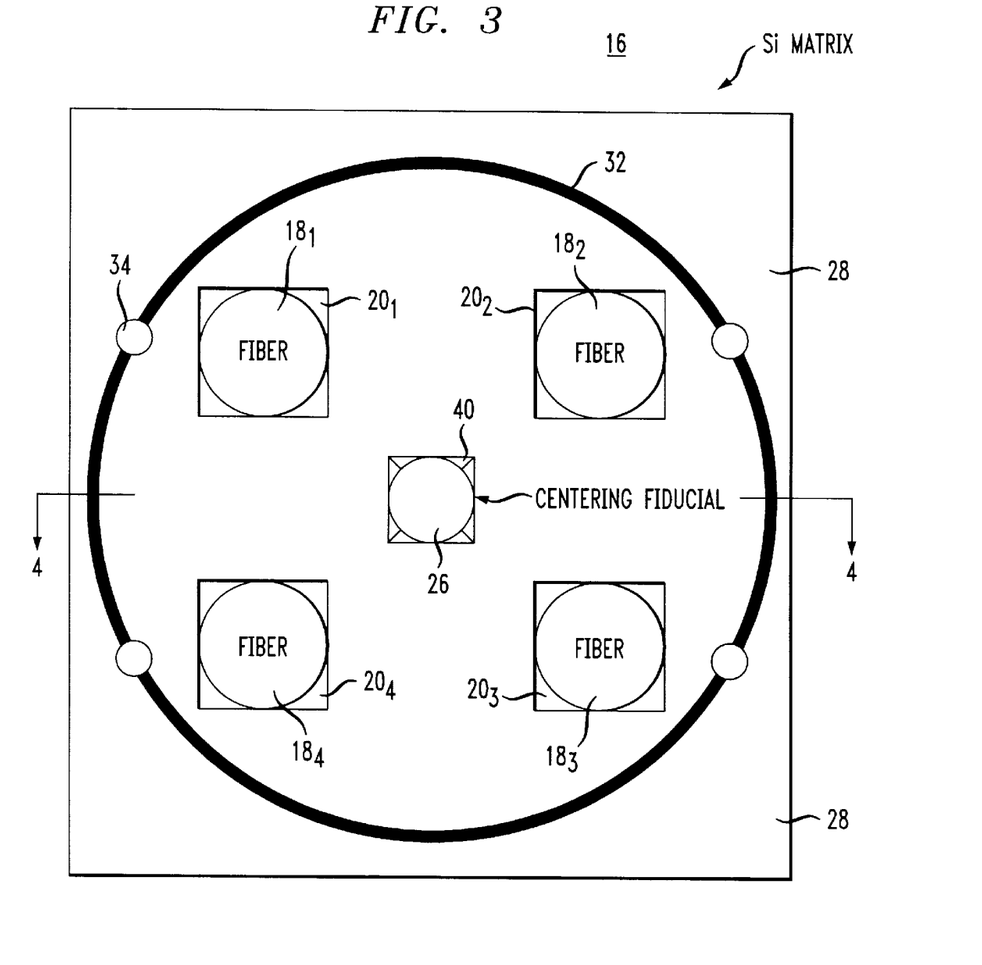
FIG. 3 is a top view of the substrate stack used to support the circular fiber array in the 1×N optical fiber switch, this embodiment including an alignment channel and centering alignment sphere.
Figure 4:
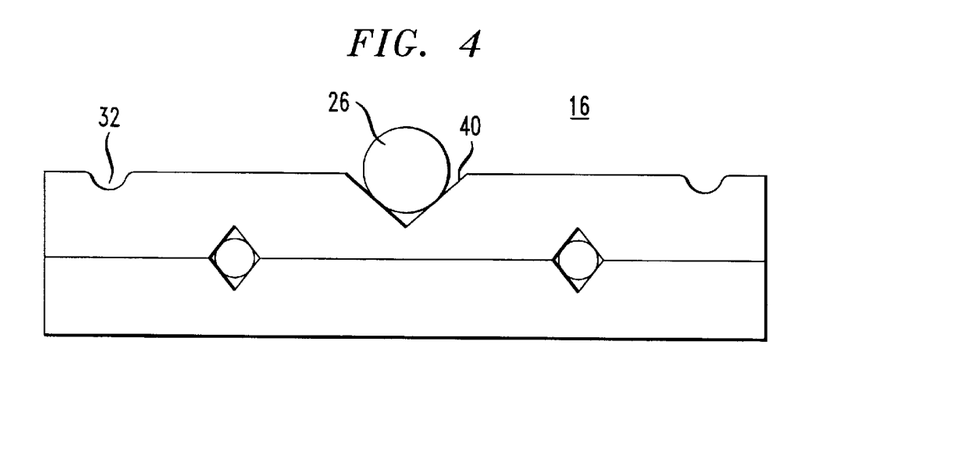
FIG. 4 contains a cut-away side view of the substrate stack of FIG. 3, taken along line 4–4.

FIG. 3 contains a top view of second substrate stack 16, particularly illustrating top surface 28 of second substrate stack 16. Centering fiducial, in this example, alignment sphere 26 is illustrated as disposed within a pyramidal detent 40 formed in the center of top surface 28 so as to mate with centering fiducial 22 of first substrate stack 10 (see FIG. 2) upon attachment of the substrate stacks. The endfaces of individual fibers $18_1$–$18_4$ forming fiber array 18 are illustrated as disposed (respectively) through vias $20_1$–$20_4$ formed through the thickness of second substrate stack 16. Channel 32 is shown as disposed to surround fiber array 18, with rounded stops 34 disposed to allow for single fiber 12 of first substrate stack 10 to properly align with a selected fiber from fiber array 18. In one embodiment, rounded stops 34 may comprise relatively small silicon spheres disposed within channel 32 and having a dimension sufficient to allow for the stops to rise above top surface 28. FIG. 4 contains a cut-away side view of second substrate stack 16, illustrating in particular the U-shaped design of channel 32. The gradual slope of channel 32 allows for sphere(s) 30 to be sufficiently captured within the channel.

Figure 5:
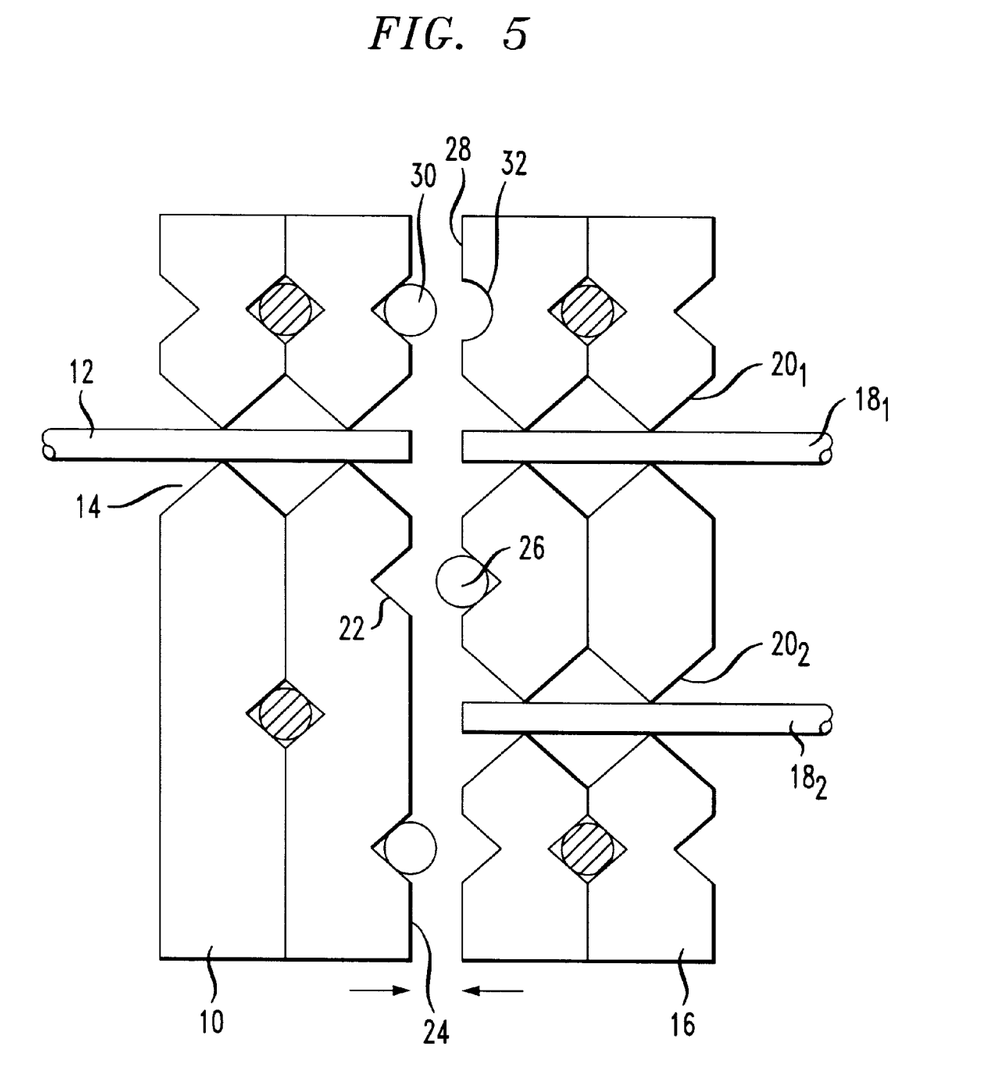
FIG. 5 is a cut-away side view of a pair of substrate stacks, illustrating the alignment between the single fiber and a selected fiber.

A (simplified) cross-sectional view of first substrate stack 10 immediately prior to contacting second substrate stack 16 is shown in FIG. 5. In the particular arrangement as illustrated in FIG. 1, fiber $18_1$, is "selected" to couple to single fiber 12 upon mating of the substrate stacks. Evident in this view is the mating of centralized pyramidal detent 22 with centralized alignment sphere 26 to align first substrate stack 10 with second substrate stack 16. Alignment spheres 30 are also shown, in association with circular channel 32.

Figure 6:
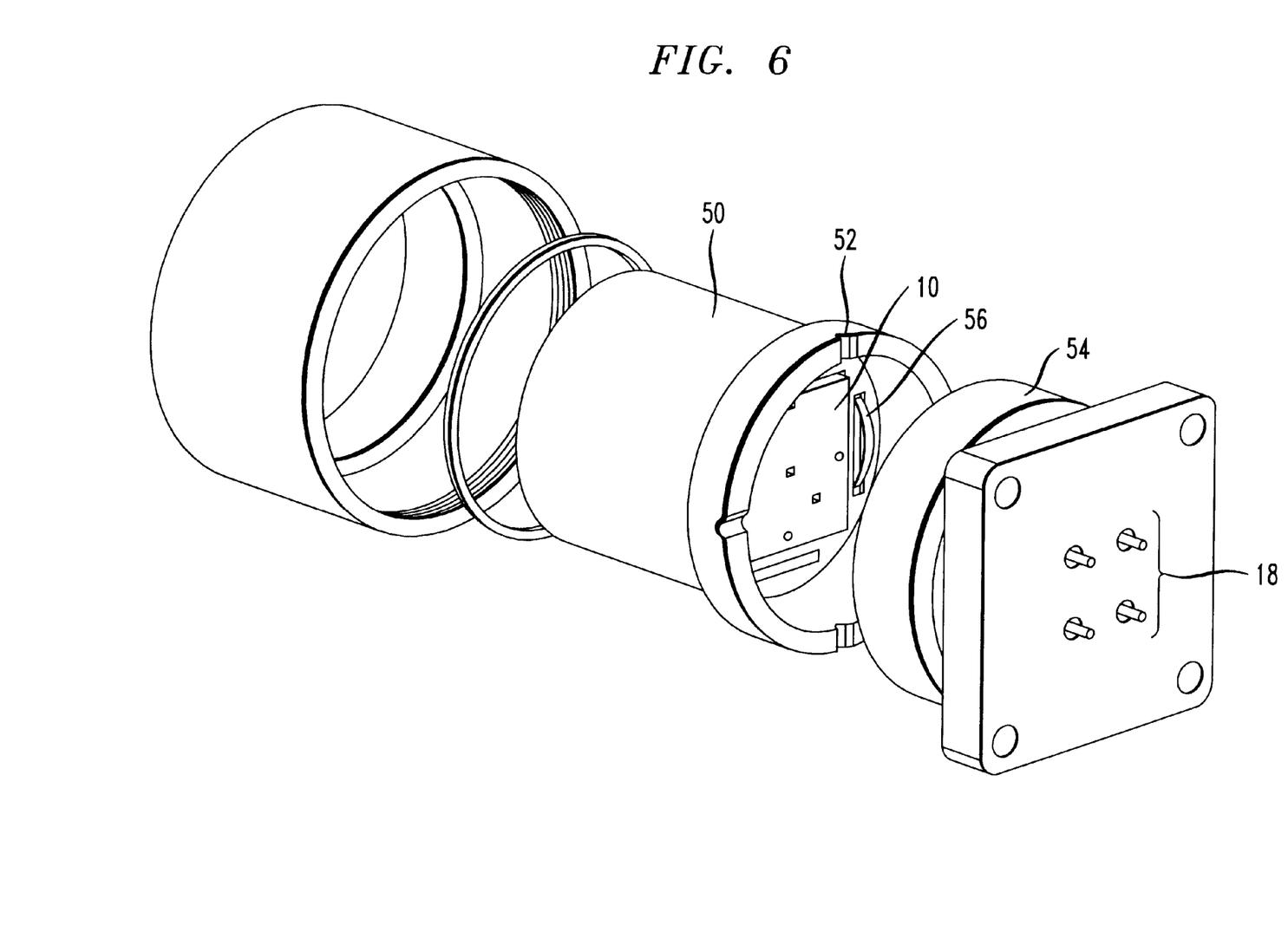
FIG. 6 is an isometric view of an exemplary arrangement of the present invention with an outer housing, this view showing the substrate stack supporting the single fiber.
Figure 7:
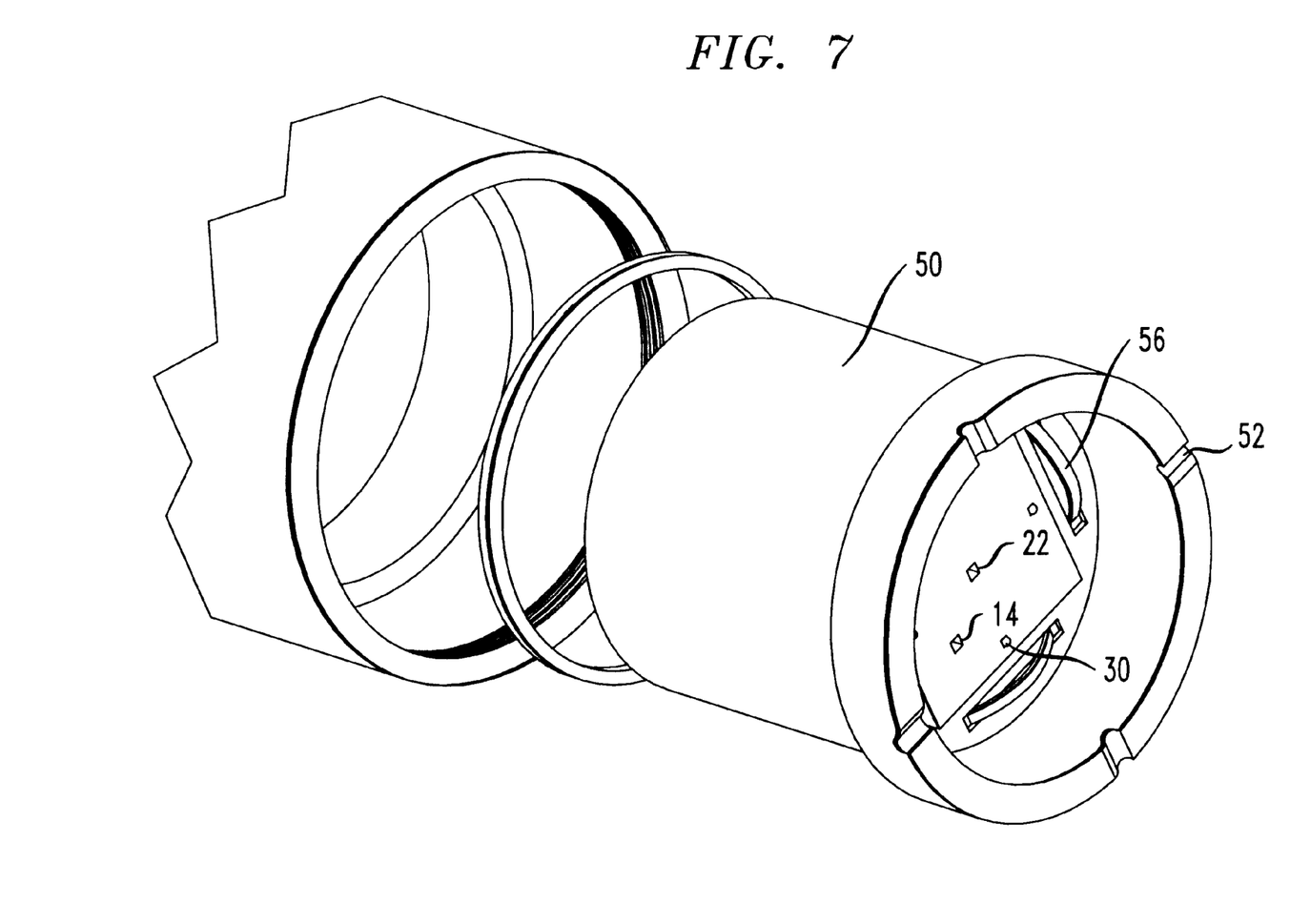
FIG. 7 is another isometric view of the same package as shown in FIG. 6, this view illustrating the substrate stack supporting the circular fiber array.

An exemplary housing suitable for use with the self-aligned 1×N rotary switch of the present invention is illustrated, in isometric form, in FIG. 6. Evident in this view is first substrate stack 10 supported within a first housing 50, where first housing 50 includes a set of registration features 52 for mating with a second housing 54 (used to support second substrate stack 16). In this particular housing embodiment a set of springs 56 (clearly illustrated in the enlarged view of first housing 50 of FIG. 7) used to control the relative movement, in the axial direction, of first substrate stack 10 relative to second substrate stack 16. Also clearly shown in the enlarged view of FIG. 7 is the location of centralized fiducial (alignment detent) 22, alignment sphere(30) and via 14 used to support single fiber 12.

Figure 8:
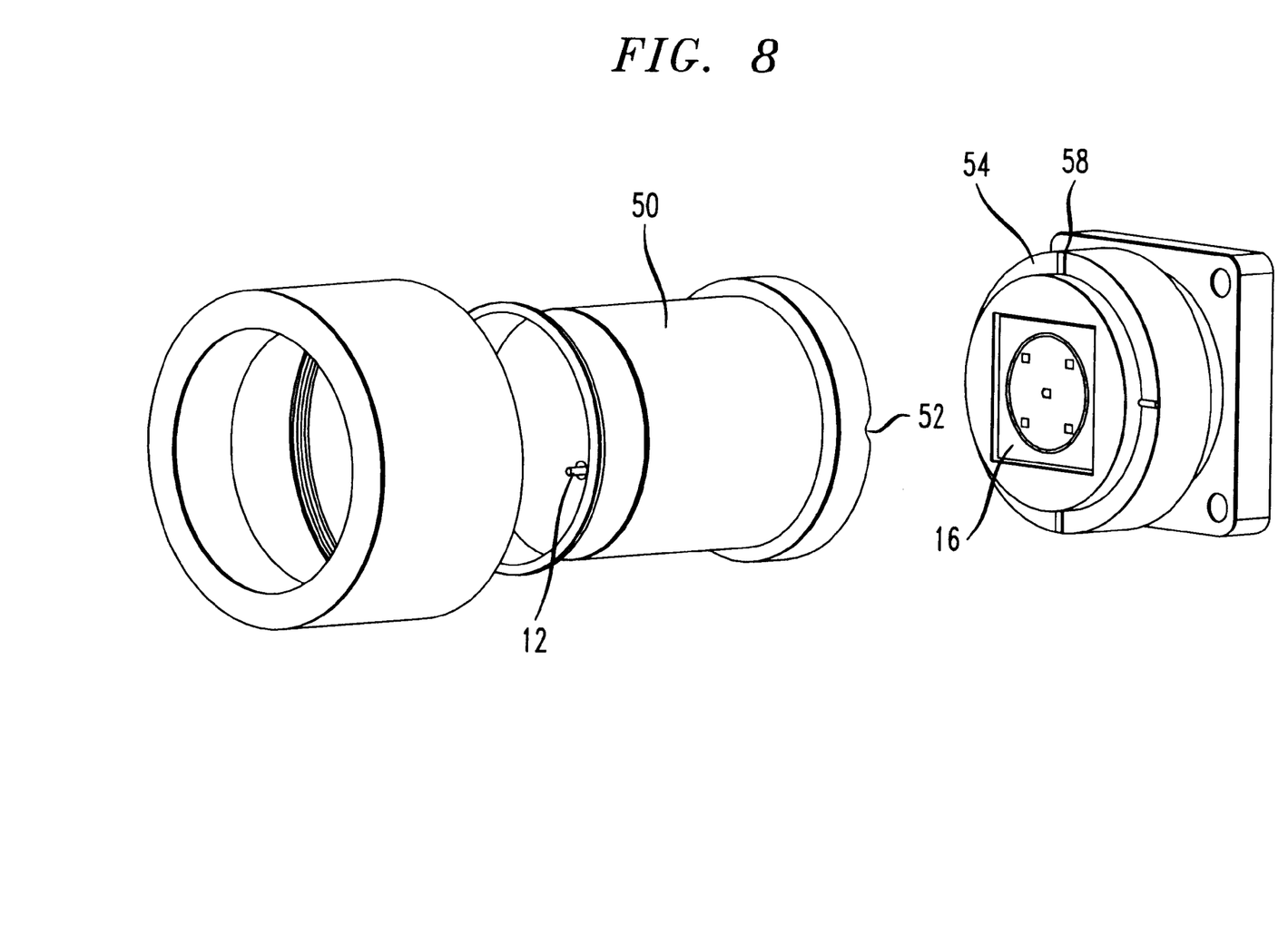
FIG. 8 contains an exploded, isometric view of the housing as shown in FIGS. 6 and 7.
Figure 9:
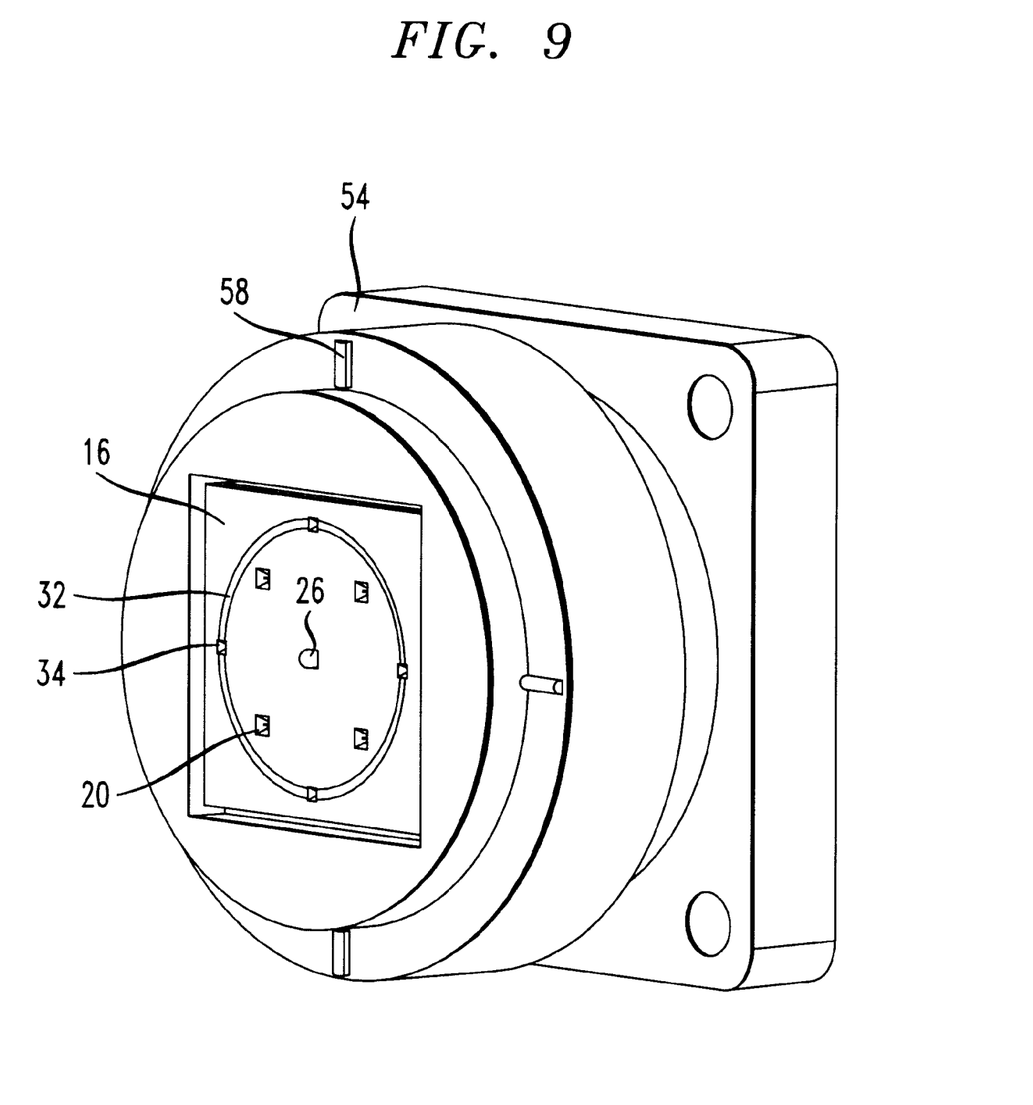
FIG. 9 is an enlarged view of one of the housing members illustrated in FIG. 8.

FIG. 8 includes an exploded, isometric view of the housing as shown above in FIGS. 6 and 7, this view showing in particular the placement of second substrate stack 16 within housing 54. A set of ridges 58 is shown on second housing 54 and used for mating with registration marks 52 when first housing 50 is mated with second housing 54. In particular, ridges 58 are used in allowing for a controlled gap between first and second substrate stacks to exist as they are rotated relative to each to affect movement of the switch between selected fibers 18. An enlarged view of second housing 54 is contains in FIG. 9, where ridges 58 are clearly visible, as are the various features associated with second substrate stack 16 discussed in detail above.

It is to be understood that the self-aligned 1×N rotary fiber optic switch of the present invention has many alternative arrangements that are considered to fall within the spirit and scope of the present invention. For example, the various depictions illustrated herein use a set of four fibers within fiber array 18. In general, any number N≧2 can be used to form the array, as long as the fibers are disposed in a circular arrangement. Additionally, the substrates forming each stack may comprise any suitable material, such as silicon (which is relatively easy to process using standard etching techniques to form the required alignment features) or a suitable plastic material. In particular, a "master" set of substrate stacks may be processed in silicon (or machined in a metal using precision machining techniques) and then used in a transfer molding (or injection molding) process, forming subsequent substrate stacks in plastic. As mentioned above, the location of the various alignment fiducials (centering detent/sphere, circular channel with spheres) may be switched between the substrate stacks provide essentially identical self-aligned coupled between the single fiber and "selected" fiber from the array. Various other modifications and alterations will occur to those skilled in the art and are considered to fall within the spirit and scope of the present invention as defined by the claims appended hereto.

What is claimed is:

1. A self-aligned 1×N fiber optic switch, said switch comprising
   a first substrate, including a top major surface, for supporting a single optical fiber disposed through the thickness thereof, said first substrate including a centering fiducial disposed in a predetermined central location of said top major surface; and
   a second substrate, including a top major surface, for support a plurality of N optical fibers disposed through the thickness thereof, said plurality of N optical fibers positioned to form a circular array with respect to the top major surface of said second substrate, said second substrate including a centering fiducial disposed in a predetermined central location of said top major surface for mating with said first substrate centering fiducial and providing self-alignment between said first and second substrates;
   said switch further comprising a circular alignment channel formed in a top major surface of the first or second substrate and comprising a diameter greater than the diameter of the circular fiber array, said alignment channel including a plurality of rounded stops disposed at predetermined locations with respect to the locations of the plurality of optical fibers; and
   at least one alignment sphere formed in the top major surface of the remaining second or first substrate, said at least one alignment sphere located to reside within the alignment channel and allow for controlled rotation of the first substrate with respect to the second substrate and alignment of the single fiber to a selected one of the plurality of N fibers as the at least one alignment sphere contacts a rounded stop disposed within the alignment channel.

2. A self-aligned 1×N fiber optic switch as defined in claim 1 wherein each substrate comprises a plurality of separate substrate components, stacked together to form a first substrate stack and a second substrate stack.

3. A self-aligned 1×N fiber optic switch as defined in claim 1 wherein the first substrate centering fiducial comprises a pyramidal detent and the second substrate centering fiducial comprises an alignment sphere that is captured within the pyramidal detent upon mating of the first substrate with the second substrate.

4. A self-aligned 1×N fiber optic switch as defined in claim 1 wherein the first substrate centering fiducials comprises an alignment sphere and the second substrate centering fiducial comprises a pyramidal detent for capturing the alignment sphere upon mating of the first substrate with the second substrate.

5. A self-aligned 1×N fiber optic switch as defined in claim 1 wherein the first and second substrates comprise silicon.

6. A self-aligned 1×N fiber optic switch as defined in claim 5 wherein the single fiber and the plurality of N fibers are disposed in etched vias formed through the silicon substrate.

7. A self-aligned 1×N fiber optic switch as defined in claim 1 wherein the first and second substrates comprise precision-machined metallic piece parts.

8. A self-aligned 1×N fiber optic switch as defined in claim 1 wherein the first and second substrates comprise plastic piece parts.

9. A self-aligned 1×N fiber optic switch as defined in claim 8 wherein the plastic piece parts comprise transfer-molded plastic piece parts.

10. A self-aligned 1×N fiber optic switch as defined in claim 8 wherein the plastic piece parts comprise injection-molded plastic piece parts.

11. A self-aligned 1×N fiber optic switch as defined in claim 1 wherein the circular alignment channel is formed on the first substrate and the at least one alignment sphere is disposed on the second substrate.

12. A self-aligned 1×N fiber optic switch as defined in claim 1 wherein the circular alignment channel is formed on the second substrate and the at least one alignment sphere is disposed on the first substrate.

13. A self-aligned 1×N fiber optic switch assembly comprising
   a first substrate, including a top major surface, for supporting a single optical fiber disposed through the thickness thereof, said first substrate including a centering fiducial disposed in a predetermined central location of said top major surface;
   a first cylindrical housing for supporting said first substrate, said first cylindrical housing extending above the top surface of said first substrate and including a set of registration detents on a top perimeter thereof;
   a second substrate, including a top major surface, for support a plurality of N optical fibers disposed through the thickness thereof, said plurality of N optical fibers positioned to form a circular array with respect to the top major surface of said second substrate, said second substrate including a centering fiducial disposed in a predetermined central location of said top major surface for mating with said first substrate centering fiducial and providing self-alignment between said first and second substrates;
   a second cylindrical housing for supporting said second substrate, said second cylindrical housing extending above the top surface of said second substrate and including a set of registration detents on a top perimeter thereof for mating with the first cylindrical housing registration detents upon mating;

said switch further comprising a circular alignment channel formed in a top major surface of the first or second substrate and comprising a diameter greater than the diameter of the circular fiber array, said alignment channel including a plurality of rounded stops disposed at predetermined locations with respect to the locations of the plurality of optical fibers;

at least one alignment sphere formed in the top major surface of the remaining second or first substrate, said at least one alignment sphere located to reside within the alignment channel and allow for controlled rotation of the first substrate with respect to the second substrate and alignment of the single fiber to a selected one of the plurality of N fibers as the at least one alignment sphere contacts a rounded stop disposed within the alignment channel.

14. A self-aligned 1×N fiber optic switch assembly as defined in claim 13 wherein the first cylindrical housing further comprises a set of spring members disposed to surround the first substrate.

15. A self-aligned 1×N fiber optic switch assembly as defined in claim 13 wherein each substrate comprises a plurality of separate substrate components, stacked together to form a first substrate stack and a second substrate stack.

16. A self-aligned 1×N fiber optic switch assembly as defined in claim 13 wherein the first substrate centering fiducial comprises a pyramidal detent and the second substrate centering fiducial comprises an alignment sphere that is captured within the pyramidal detent upon mating of the first substrate with the second substrate.

17. A self-aligned 1×N fiber optic switch assembly as defined in claim 13 wherein the first substrate centering fiducials comprises an alignment sphere and the second substrate centering fiducial comprises a pyramidal detent for capturing the alignment sphere upon mating of the first substrate with the second substrate.

18. A self-aligned 1×N fiber optic switch as defined in claim 13 wherein the first and second substrates comprise silicon.

19. A self-aligned 1×N fiber optic switch as defined in claim 18 wherein the single fiber and the plurality of N fibers are disposed in etched vias formed through the silicon substrate.

20. A self-aligned 1×N fiber optic switch as defined in claim 13 wherein the first and second substrates comprise precision-machined metallic piece parts.

21. A self-aligned 1×N fiber optic switch as defined in claim 13 wherein the first and second substrates comprise plastic piece parts.

22. A self-aligned 1×N fiber optic switch as defined in claim 21 wherein the plastic piece parts comprise transfer-molded plastic piece parts.

23. A self-aligned 1×N fiber optic switch as defined in claim 21 wherein the plastic piece parts comprise injection-molded plastic piece parts.

24. A self-aligned 1×N fiber optic switch as defined in claim 13 wherein the circular alignment channel is formed on the first substrate and the at least one alignment sphere is disposed on the second substrate.

25. A self-aligned 1×N fiber optic switch as defined in claim 13 wherein the circular alignment channel is formed on the second substrate and the at least one alignment sphere is disposed on the first substrate.

* * * * *